United States Patent [19]

Graham et al.

[11] Patent Number: 4,952,798
[45] Date of Patent: Aug. 28, 1990

[54] OPTICAL SIMULATOR WITH LOOP-BACK ATTENUATOR AND OPTICAL THIN FILM

[75] Inventors: Bruce M. Graham; Susan J. Lathan, both of Hummelstown, Pa.

[73] Assignee: AMP Incorporated, Harrisburg, Pa.

[21] Appl. No.: 460,446

[22] Filed: Jan. 3, 1990

[51] Int. Cl.$^5$ .......................... H01J 5/16; H01J 40/14; C01N 21/00
[52] U.S. Cl. ............................... 250/227.11; 350/96.2; 356/73.1
[58] Field of Search ........................... 250/227.11, 239; 350/96.15, 96.20, 96.22; 356/73.1

[56] References Cited

U.S. PATENT DOCUMENTS

| | | | |
|---|---|---|---|
| 3,628,039 | 12/1971 | Ochs | 250/551 |
| 3,999,837 | 12/1976 | Bowen et al. | 350/96.22 |
| 4,081,258 | 3/1978 | Goell et al. | 356/73.1 |
| 4,261,640 | 4/1979 | Stankos | 350/96.15 |
| 4,702,549 | 8/1984 | Duck | 350/96.15 |
| 4,708,422 | 11/1987 | Arnoax et al. | 356/73.1 |
| 4,736,100 | 7/1986 | Vastagh | 250/227 |

OTHER PUBLICATIONS

MacLeod, Thin-Film Optical Filters, McMillian Publishing Co, New York, 1986, pp. 164-165 & 155-157.
"Schott Filter Glass Catalog," No. 3566E/USAiii/8-7/o.P/printed in West Germany, Schott Glass Technologies Inc, 1987.

Primary Examiner—David C. Nelms
Assistant Examiner—Stephone B. Allen

[57] ABSTRACT

An optical simulator 10, shaped to be interchangeable with a complementary connector 7 that intermates with an optical connector 6 having an optical emitter 4 and an optical detector 5, comprises an alignment fixture 12 with connectors 21 and 22 for intermating with the optical emitter 4 and the optical detector 5, and an optical fiber 11 formed in a loop and installed within the alignment fixture 12 with a first end face 39 of the loop 11 aligned through a corresponding alignment fixture connector 24, with the emitter 4 and a second end face 37 of the loop 11 aligned through a corresponding alignment fixture 25, with the detector 5 of the optical connector 6. The optical fiber 11 is formed in a loop further with a film forming a thin membraceous skin on an end of the optical fiber to provide controlled attenuation of optical power to the detector 5.

14 Claims, 4 Drawing Sheets

OPTICAL SIMULATOR WITH LOOP-BACK ATTENUATOR AND OPTICAL THIN FILM

FIELD OF THE INVENTION

This application is related to co-pending Application Ser. No. 07/460,434, filed 1/03/90. The invention relates to testing optical equipment such as a transceiver prior to installation in an optical communications system and particularly to a simulator for testing such optical equipment.

BACKGROUND OF THE INVENTION

Optical communications systems utilize optical carrier waves to transmit communications signals among various items of optical equipment that are coupled into the systems and that use the systems to communicate with one another. The systems utilize optical fiber cables for transmitting the carrier waves from one item of optical equipment to another. For example, an optical communications system may comprise a computer central processing unit, CPU, as one item of equipment, a workstation, a peripheral, such as a printer, and optical fiber cables linked among the CPU, the workstation and printer.

Each item of optical equipment is coupled to the system by means of an optical connector that is constructed for disconnect coupling with the optical fiber cables. A duplex communications system utilizes two optical cables, one for receiving optical signals from an item of optical equipment, and another for sending signals. Each item of optical equipment has an optical emitter for sending the signals and a detector for receiving the signals. Optical connectors provide disconnect coupling for both the optical emitter and the optical detector.

Testing of such items of optical equipment is a necessity to assure proper design. In testing, the environment must accurately simulate the anticipated environment of operation which includes attenuation which comes about through loss of photons by the light signal during transit, thus reducing amplitude.

Fiber attenuation may arise from two sources; absorption and scattering. Impurities in glass absorb light energy, turning photons into heat. Some impurities remain as residue in the glass fiber after purification and processing; others are dopants added purposely to obtain certain optical properties. Scattering results from imperfections in the fibers and from the basic structure of the fiber. Rayleigh scattering comes from the atomic and molecular structure of the glass, and from density and composition variations that are natural by-products of manufacturing. Unintentional variations in density and fiber geometry occur during fiber manufacture and cabling. Small variations in the core diameter, microbends, and small incongruities in the core-to-cladding interface cause loss.

Attenuation for fiber is specified in decibels per kilometer (dB/km). For commercially available fibers, attenuation ranges from about one dB/km for premium small core glass fibers, to over 2000 dB/km for large core plastic fibers.

Some installed systems involve several miles of optical fibers. Hence, and typically, testing is done by simulation whereby the emitter and detector of the item of optical equipment to be tested are connected to a device that simulates the optical system, and the operation of the item is tested as though the item were coupled into the system itself and not the testing device.

First simulators were devices capable of generating special test signals. Testing was performed externally on the item of equipment being tested. However, as items of optical equipment became increasingly complex, the need for testing has become greater. Further, with the development of more sophisticated capabilities, optical equipment has been designed with internal testing capabilities permitting self-testing. With self-testing, the expense of specialized testing equipment and associated testing procedures has been substantially reduced. In place of long lengths of cabling to simulate actual operations, and in place of simulators that are devices that produce complex signals or measurements, are simplified simulators having internal attenuating mechanisms.

The present invention relates to such simulators and in the form of loop-back attenuators. Loop-back attenuators are defined as simulators providing a communication signal path that forms a loop from the emitter to a detector of the same item of optical equipment such that optical signals transmitted from the item under test are looped back to the same item and internally transmitted among its component parts. Simulators which are loop-back attenuators that purposely simulate a loss of signal intensity expected of a communications system in which the item may be installed for "on-line" operation. Vastagh, U.S. Pat. No. 4,736,100, discloses a known loop-back simulator involving an optical fiber cable formed in a loop and having ends of the fiber connected with alignment ferrules. The loop is installed in an alignment fixture that aligns the ends of the loop with the emitter and detector of the item to be tested.

This known loop-back attenuator suffers from disadvantages. Firstly, it is difficult to provide, within the short loop-back cable structure of the simulator, an attenuation accurately simulating that of the much larger optical system that the optical item, such as a transceiver, will be attached to during actual operation. Another problem is one of magnitude in that too much undiminished optical power may saturate the detector of the transceiver. Another problem is accurately duplicating the amount of attenuation in the operations system so that the testing device creates an environment approximating the operation of the actual system for meaningful test results.

Objects of the present invention include providing a simulator in the nature of a loop-back attenuator that, in a compact device, is capable of reproducing the total attenuation of a substantially larger cable network. Other objects include providing a device capable of sufficiently attenuating optical power between emitter and detector of a transciever or the like, to prevent saturation of the detector, and providing a device which easily and accurately may be controllably altered to match the particular amount of attenuation desired to simulate actual environmental operating conditions or to meet manufacturer's standards.

Another problem is that devices of different manufacturers, and even, indeed, the same devices of the same manufacturer, have emitters that put out differing optical power. An objective in this respect, is to provide a device which may easily be altered to approximate the differing optical power outputs of devices and the attenuation characteristics to be expected in the operating systems.

Another objective of the present invention is providing an optical simulator which is a loop-back attenuator which may be precisely customized to provide a specified or targeted attenuation.

SUMMARY OF THE INVENTION

The invention resides in a simulator in the form of a loop-back attenuator that is constructed for disconnect coupling to an optical connector to, for example, a transceiver, for duplex optical communications. According to the invention, an optical fiber is utilized in loop-back form, and controlled attenuation is provided to the system by utilization of an optical filter in the form of an optical thin film coating.

A filter is an optical element that partially absorbs incident electromagnetic radiation in the visible, ultraviolet, or infra red spectra, consisting of a pane of glass or other partially transparent material. In general, a filter is a selective device that transmits a desired range of energy, while substantially attenuating all other ranges.

Duck, et al, U.S. Pat. No. 4,702,546 discloses a variable optical attenuator used with an on-line fiber optic system including a printed circuit board. Attenuation is provided by a thin optical filter element which is mounted on a reciprocating means for selectively positioning the element between the fiber ends and along the transverse axis of the fibers. Stankos, et al, U.S. Pat. No. 4,261,640 relates to testing systems using in-line fiber optic lengths. This system includes a device for holding a first and second optic fiber with a filter disk therebetween to provide attenuation. The degree of attenuation provided is set to correspond to the attenuation of the length to be simulated minus the combined attenuation of the first and second optic fibers. The object of the Stankos, et al invention is to equalize the attenuation of one length of optic fiber in regard to another parallel length of optic fiber having a greater attenuation.

Differing is an optical filter utilized with a simulator in the form of a loop-back attenuator involving further considerations of providing attenuation in a much shorter length of optical fiber, and avoiding the problems of saturation, and achieving the objective of simulating a system of emitter and detector signals.

Where the simulator of application (14635) is characterized by an optical fiber formed in a loop having an optical filter attached to an end face of the fiber to provide controlled attenuation of optical power, and where the filters are discrete light transmitting structures such as a pane of glass, the present invention relates to a simulator having an optical fiber formed in a loop with a film applied by vapor deposition to form a thin membraceous skin on the end of the optical fiber to provide controlled attenuation of optical power. While the glass filters of (14635) are at least 0.1mm thick, the films of the present invention are applied in layers of 0.1 to 10 microns in thickness, preferably 2 to 5 microns.

The optical simulator of the present invention is a loop-back attenuator shaped to be interchangeable with a complementary connector that intermates with an optical connector having an optical emitter and an optical detector, the optical simulator comprising an alignment fixture with connectors for intermating with the optical emitter and the optical detector, and an optical fiber formed in a loop and installed within the alignment fixture with a first end face of the loop aligned, through a corresponding alignment fixture connector, with the emitter, and a second end face of the loop aligned, through a corresponding alignment fixture, with the detector of the optical connector. The optical fiber is formed in a loop having a film applied by vapor deposition to form a thin membraceous skin on the end face of the fiber to provide controlled attenuation of optical power to the optical detector of the optical connector. A further aspect of the invention resides in a plug compatible shape for a loop-back attenuator specifically for disconnect coupling to an existent optical connector.

The film may be a multilayer dielectric coating. High reflectance can be obtained from a stack of quarter-wave dielectric layers of alternate high and low index as described in Thin Film Optical Filters, Macleod, McMillan Publishing Co., New York, 1986, at paqes 164 to 165. The film may form a neutral density filter consisting of single metallic layers with thicknesses chosen to provide targeted transmission values. Rhodium, palladium, tungsten, chromium, as well as other metals are stable, but preferred is nickel/chromium alloy as disclosed in Thin Film Optical Filters, Macleod, McMillan publishing Co., NeW York, 1986, at pages 155 to 157. A particular advantage of films is that the loop-back may be customized by selective application of films to achieve exact characteristics of targeted attenuation. The attenuation or loss may be calculated from index of refraction for the constituent films to be applied to the fiber end by relationships taught by Macleod in Thin Film Optical Filters, supra, and the composition of the constituent films varied to achieve a desired or targeted attenuation.

DESCRIPTION OF THE DRAWINGS

Referring to FIG. 1, is shown a portion of a printed circuit board 1 of a type found internally of a transceiver, not shown, that has an optical transmitter 2 and an optical receiver 3. In reference to FIG. 3, an optical emitter 4 of the transmitter 2 and an optical detector 5 of the optical receiver 3 are adjacent each other and are received by a transceiver adapter assembly 6 that is mounted on the circuit board 1 and that is constructed for disconnect coupling with a complementary connector 7 provided with optical fiber cables 8 and 9 that are part of a duplex communications system, not shown, to which the transmitter 2 and receiver 3 are coupled for optical communications with other items of the system.

Figure 1:
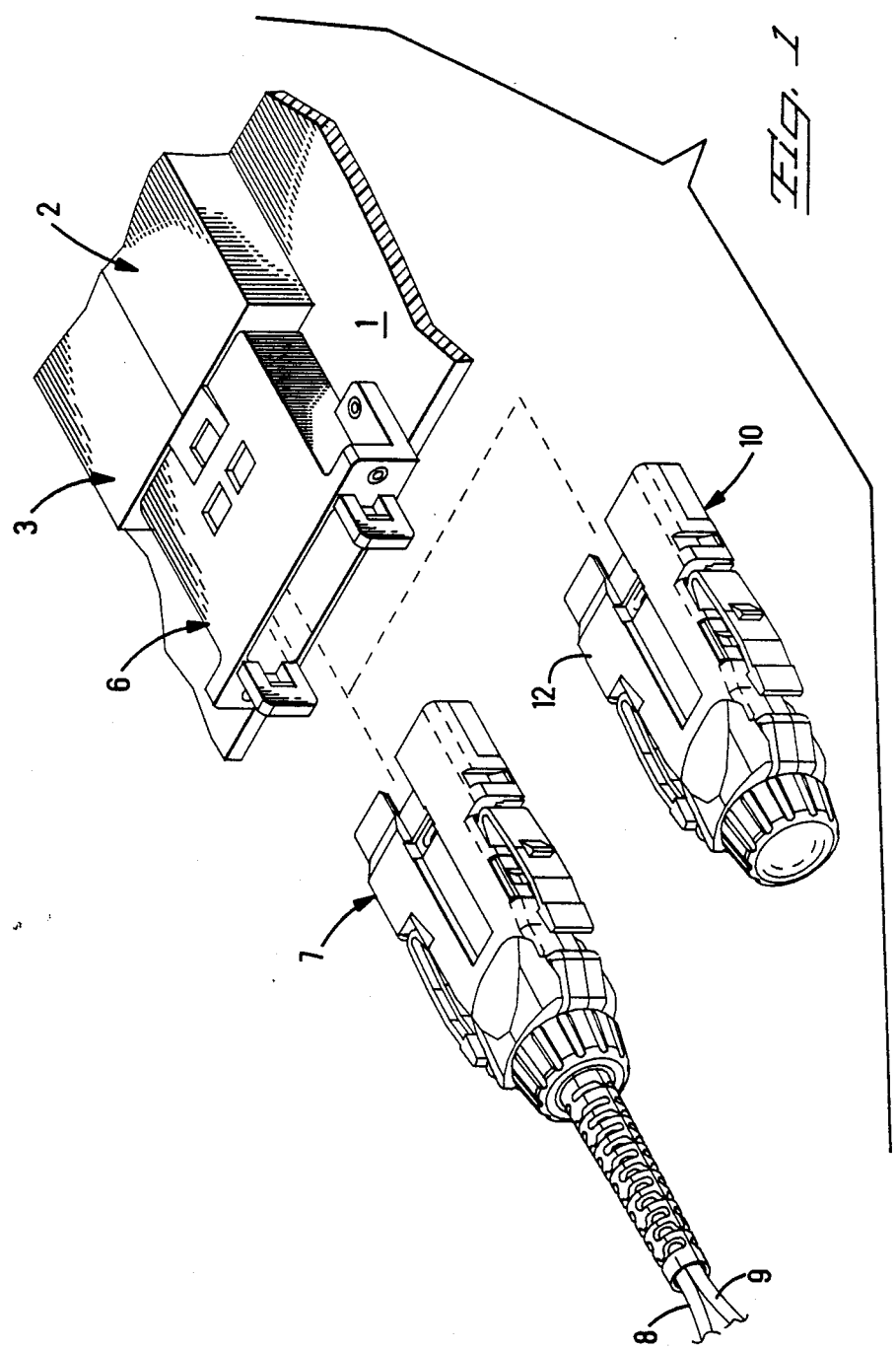
FIG. 1 is a perspective view of the optical simulator adapated for disconnect connection, in place of a known complementary connector for optical fiber cable, with an optical connector mounted on a circuit board together with an optical detector and an optical emitter.
Figure 2:
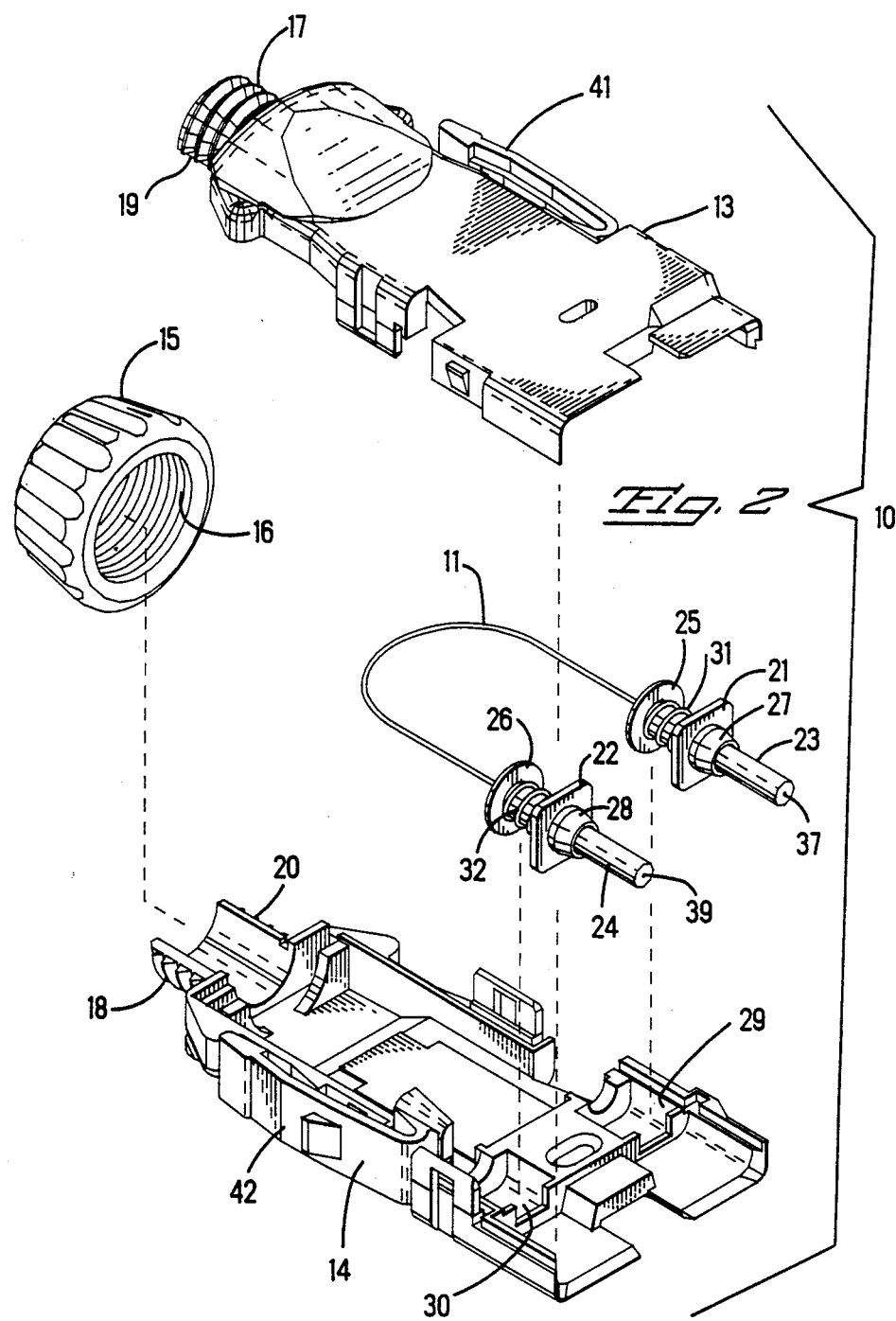
FIG. 2 is a fragmented perspective view with parts exploded, of the loop-back attenuator of the present invention.
Figure 3:
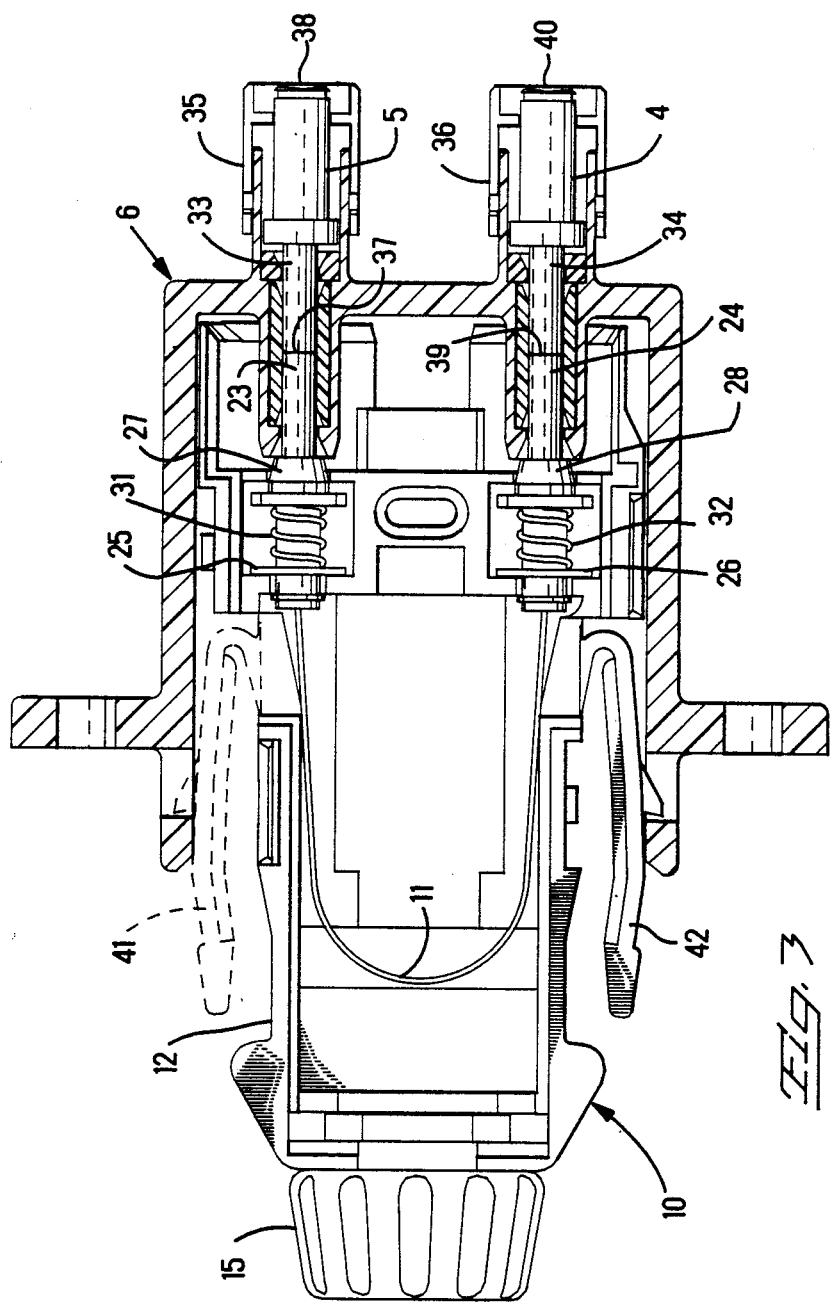
FIG. 3 is a front sectional view of the loop-back attenuator engaged with the optical connector mounted on a circuit board.

A simulator 10, in the form of a loop-back attenuator, is shown in FIGS. 1, 2 and 3 and is constructed for disconnect coupling with the connector 6. Simulator 10 simulates the optical attenuation of the system to which the transmitter 2 and receiver 3 are coupled for duplex communication. Attenuator 10 provides a loop-back optical path with optical fiber 11 that receives the optical emission from emitter 4 and transmits the optical emission along the loop-back path 11 to the detector 5 for use in testing the operation of the transceiver in which the transmitter 2 and receiver 3 are incorporated. The attenuator 10 comprises an alignment fixture 12 which is a hollow body of molded upper cover 13 and molded lower cover 14. The covers 13 and 14 are of insulated plastic material formed by molding into a shape that has an exterior with dimensions that intermate with the optical connector 6 to thereby serve as a substitute for the connector 7 associated with the optical fiber cables 8 and 9. Both the upper cover 13 and the lower cover 14 are complementarily contoured in their interiors so as to form cavities shaped to securely encompass and hold in place loop-back optical fiber 11 as is hereinafter described.

Referring to FIGS. 2, 3, 4A and 4B, upper cover 13 of alignment fixture 12 intermates with lower cover 14 by snap-in connection. Attenuator 10 is shown with threaded cap 15 with inward threads 16 for fit with the outward directed threads 17 and 18 of extension sections 19 and 20 to secure upper cover 13 together with lower cover 14 to encompass and provide an enclosure for optical fiber 11. At the ends of optical fiber 11 are fiber connectors 21 and 22 with alignment ferrules 23 and 24. Rear flanges 25 and 26 and truncated, cone-shaped, lead-in sections 27 and 28 are formed so as to nestle within complementary cavities formed at 29 and 30 by the closure of upper cover 13 and lower cover 14. Springs 31 and 32 bias the lead-in sections 27 and 28 to form secure fits within cavities 29 and 30.

Shown in FIG. 3, is optical fiber 11 enclosed within alignment fixture 12 and alignment fixture 12 engaged, in place of the complementary connector 7, with a connector such as the adapter assembly of a transceiver 2 (FIG. 1). Alignment ferrules 23 and 24 fit within the through passageways 33 and 34 of active device mounts 35 and 36 of the transceiver adapter assembly 6 to align end face 37 of optical fiber 11 with optical detector end 38 of the optical transmitter 2 and to align end face 39 of optical fiber 11 with optical emitter end 40 of the optical receiver 3. The alignment fixture 12 is secured within the transceiver adapter assembly 6 by biased spring fit of latch 41 and latch 42 against the inner walls of the assembly 6.

Figure 4A:
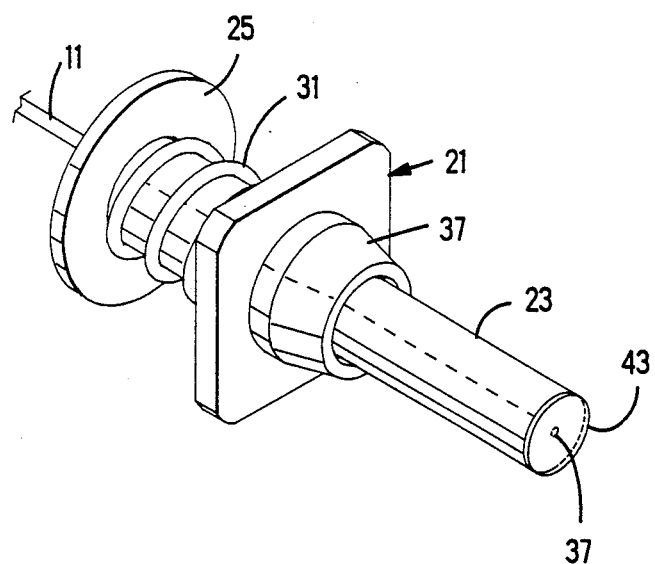
FIG. 4A is a perspective view of the preferred embodiment of the optical film applied to an end face of the optical fiber of the loop-back attenuator of the present invention and FIG. 4B is a fragmentary cross-sectional view of the end of the optical fiber and film of FIG. 4A.
Figure 4B:
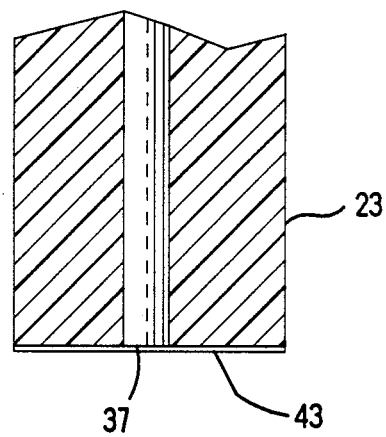

Referring to FIGS. 4A and 4B, is shown one embodiment of the present invention whereby the detector end face 37 of optical fiber 11 has been modified with the deposition of a nickel/chromium alloy film 43 to thereby change the optical power transmitting capabilities of the optical fiber 11. Thereby, the optical power in optical fiber 11 is attenuated in accord with the present invention.

In order to simulate the operation of optical communication systems, most applications require, and most manufacturers specify simulators, which will provide an attenuation in the range of from 12 dB to about 1 dB. Preferably, and for the great majority of applications, the attenuation provided by the present invention for a given wavelength will range between 3 and 10 dB.

EXAMPLE

Jacket and Kevlar strength members are removed but the buffer coating is retained on a 5.5 inch length of 62.5/125 micron optical fiber. One inch of buffer coating is stripped from each fiber end and FSD connectors are epoxied onto both ends of the fiber. The assembly of fiber and FSD connectors is mounted in an FSD polishing shell, and heated for two hours at 65 degrees Celsius to cure the epoxy. The connector end faces are polished to an optical quality finish using abrasion paper of a final grit size of 0.3 micron.

The optical film is applied to one end of the fiber by vacuum phase deposition. The fiber end is first meticulously cleaned with alcohol and detergent and water and finally by glow discharge. The fiber is placed in a rack that limits exposure to the deposition process to one end face. The rack also acts as a mask preventing coating of the rest of fiber and connector assembly. Rack and fiber are placed in the deposition chamber and connected to a light source illuminating the fiber end at a specified wavelenth of 1.3 micrometer during the deposition process. The opposite end of the fiber is connected to an optical detector to analyze transmitted power. In this example, a target attenuation of 10 dB's is specified at 1.3 micrometer wavelength.

The chamber is evacuated to $10^{-4}$ torr in the presence of a nickel-chromium spiral to provide a transmission level at the 10 dB's target in accord with the procedure of Banning, neutral density filters of Chromel A, *J. Opt. Soc. Am.* 37 686-7, until sufficient deposition has been achieved to provide 10 dB's of attenuation.

Because the invention can take numerous forms, it should be understood that the invention is limited only insofar as is required by the scope of the following claims:

We claim:

1. An optical simulator shaped to be interchangeable with a complementary connector that intermates with an optical connector having an optical emitter and an optical detector, the optical simulator comprising; an alignment fixture with connectors for intermating with the optical emitter and the optical detector, and an optical fiber formed in a loop and installed within the alignment fixture with a first end face of the loop aligned, through a corresponding alignment fixture connector, with the emitter, and a second end face of the loop aligned, through a corresponding alignment fixture, with the detector of the optical connector;

the optical fiber being formed in a loop with a film forming a thin membraceous skin on an end face of the fiber to provide controlled attenuation of optical power to the optical detector.

2. The optical simulator of claim 1 wherein the film is an optical filter which results in the attenuation of optical power to the optical detector in the range of between 3 dB and 7 dB.

3. The optical simulator of claim 1 wherein the film is an optical filter which results in the attenuation of optical power to the optical detector in the range of between 12 dB and 1 dB.

4. The optical simulator of claim 1 wherein the film is applied by vapor deposition.

5. The optical simulator of claim 1 wherein the film is a reflective dielectric thin film coating.

6. The optical simulator of claim 1 wherein the film is a multilayer reflective dielectric thin film coating.

7. The optical simulator of claim 1 wherein the film forms a neutral density filter consisting of single metallic layers.

8. The optical simulator of claim 1 wherein the film is formed by vapor deposition of a metallic chosen from the group consisting of rhodium, palladium, tungston, chromium, nickel and alloys thereof.

9. The optical simulator of claim 1 wherein the film is formed by vapor deposition of a nickel chromium alloy.

10. The optical simulator of claim 1 wherein the optical connector is the adapter assembly of a transceiver.

11. The optical simulator of claim 1 wherein the simulator is a plug-compatible shape for disconnect coupling to the optical connector to a transceiver.

12. The optical simulator of claim 1 wherein the simulator comprises an alignment fixture encompassing the optical fiber in the form of a loop.

13. The optical simulator of claim 1 wherein the alignment fixture comprises an upper cover with an extension section with outwardly directed threads and a lower cover with extension section with outwardly directed threads.

14. The optical simulator of claim 13 wherein the upper cover and lower covers are attached by snap-in connection and secured by a threaded cup interthreaded with the threads of the unitary extension section formed by the complementary fitting of the extension section of the upper cover and the extension section of the lower section.

* * * * *